US005198198A

United States Patent [19]

Gladfelter et al.

[11] Patent Number: 5,198,198

[45] Date of Patent: Mar. 30, 1993

[54] ARTICLE COMPRISING A WATER SOLUBLE BAG CONTAINING A MULTIPLE USE AMOUNT OF A PELLETIZED FUNCTIONAL MATERIAL AND METHODS OF ITS USE

[75] Inventors: Elizabeth J. Gladfelter, Falcon Heights; Sheryl D. Slocumb, New Brighton, both of Minn.

[73] Assignee: Ecolab Inc., St. Paul, Minn.

[21] Appl. No.: 439,796

[22] Filed: Nov. 21, 1989

Related U.S. Application Data

[60] Division of Ser. No. 368,085, Jun. 16, 1989, abandoned, which is a continuation of Ser. No. 104,458, Oct. 2, 1987, abandoned.

[51] Int. Cl.[5] ...................... B01D 12/00; C11D 17/00

[52] U.S. Cl. ...................................... 422/264; 252/90; 252/174; 252/174.11; 252/174.12; 252/174.23; 252/135; 252/136; 252/95; 252/103; 252/554; 252/558; 252/535; 252/539; 252/156; 252/174.14

[58] Field of Search ....................... 252/90, 91, 92, 93, 252/134, 135, 174.11, 142, 174.14, 174.12, 535, 539; 206/524.1, 524.7; 222/5, 93, 53, 185; 422/264

[56] References Cited

U.S. PATENT DOCUMENTS

| | | | |
|---|---|---|---|
| 3,198,740 | 8/1965 | Dunlop, Jr. et al. | 252/106 |
| 3,892,905 | 7/1975 | Albert | 428/220 |
| 4,099,912 | 7/1978 | Ehrlich | 8/137 |
| 4,234,442 | 11/1980 | Cornelissens | 252/90 |

*Primary Examiner*—Prince Willis, Jr.
*Assistant Examiner*—John F. McNally
*Attorney, Agent, or Firm*—Merchant, Gould, Smith, Edell, Welter & Schmidt

[57] ABSTRACT

An article comprising a water soluble container containing a multiple use amount of a pelletized functional composition such as a fabric treatment composition, a warewashing composition, a laundry composition, a pot and pan presoak composition, a silverware presoak composition, a floor cleaner composition, a rinse additive composition, a disinfectant composition, a sanitizer composition, a general purpose cleaner composition, etc. The article may be optionally enclosed in a water impervious outerwrap. A method for using the article by placing the article inside a dispenser wherein the article is contracted with water having a sufficient temperature and pressure to dissolve the water soluble bag and the pelletized functional material contained therein in order to form a solution.

21 Claims, 1 Drawing Sheet

ARTICLE COMPRISING A WATER SOLUBLE BAG CONTAINING A MULTIPLE USE AMOUNT OF A PELLETIZED FUNCTIONAL MATERIAL AND METHODS OF ITS USE

This is a division of application Ser. No. 07/368,085, filed Jun. 16, 1989, which is a continuation of application Ser. No. 104,458, filed Oct. 2, 1987 both abandoned.

FIELD OF THE INVENTION

The invention relates to an article comprising a water soluble bag containing a multiple use amount of a pelletized water soluble or dispersible functional material. A fabric treatment composition, warewashing composition, a laundry composition, a pot and pan presoak composition, a silverware presoak composition, a floor cleaner composition, a rinse additive composition, a disinfectant composition, a sanitizer composition, a general purpose cleaner composition, etc. all can be packaged and dispersed from the water soluble bag.

More particularly, the invention relates to an article comprising a water soluble bag containing a multiple use amount of a pelletized functional composition which can be used in a dispenser wherein the water soluble bag is dissolved upon contact with a spray or stream of water from the dispenser exposing the pellets to the water. Upon contact with water, the pellets in the dispenser dissolve over a period of time, forming a use solution.

BACKGROUND OF THE INVENTION

In the past, many institutional and industrial cleaning apparatuses, warewashing and laundry machines have typically utilized a powdered detergent or a solid cast detergent in a disposable insoluble container in a spray-type dispenser to form a detergent solution upon contact between the water spray and the cleaner. The powdered detergent or solid cast detergent in a disposable container is typically placed in a dispenser wherein the powdered detergent or solid cast detergent is contacted with a water spray in order to form a detergent use solution.

Powder detergent can be easily spilled by the user causing waste and possible injury. Powders are also disadvantageous in that they can exhibit dusting when being poured into a powdered detergent dispenser posing the risk of inhalation to nearby persons. Powdered detergent compositions are also easy to misuse and waste. In addition powders can be easily pilfered. Moreover, there is a high likelihood of direct user contact with the detergent whenever a powdered detergent is utilized. Furthermore, powders are not very concentrated since they generally contain a number of fillers. Thus, a user of powdered detergent must purchase and store a rather large quantity of detergent.

Powders also have a tendency to clump and cake after they have been contacted with water and allowed to dry in a dispenser over a period of time. This caking of the powdered detergent diminishes the amount of exposed surface area which can be contacted by water in the dispenser during subsequent detergent formation cycles. The caking of the powdered detergent thus interferes with dispensing efficiency.

Solid cast detergents have solved the basic problems in the use of powdered detergents. However, many customers continue to use powdered detergents out of habit or from a reluctance to install new dispensers or for cost or other reasons.

Single use domestic detergent .packets comprising powdered or pelletized detergent within a water soluble single use packet are known in the art. See Dunlop, U.S. Pat. No. 3,198,740. Such packets are intended for direct insertion into the wash water contained in a washing machine and are not intended for use in a dispenser. Each packet equals one use or application. In addition, such packets are intended for domestic rather than institutional use.

A need exists for a functional material that can be used in a powdered dispersion without exposing the user to powder related hazards.

A need therefore exists for an institutional multiple use functional composition which can be used in a dispenser to form a solution which does not pose powder-like safety hazards to the user such as through dusting, inhalation and spillage.

A need also exists for a multiple use functional composition replacement for powders which can possess a high concentration of active ingredient and which also demonstrates a high degree of formulation flexibility.

A need also exits for a multiple use functional composition powder replacement which minimizes waste, pilferage and misuse of the functional composition.

A need also exists for a nonreuseable multiple use functional composition powder replacement in which there is no customer contact with the functional composition.

A need also exists for a multiple use functional composition in which a replacement multiple use functional composition can be placed in the dispenser directly on top of the multiple use functional composition contained in the dispenser without first having to remove a disposable container or waiting until the functional composition is consumed.

A need also exists for a multiple use functional composition which does not significantly clump and cake after having been contacted with water and allowed to dry adversely affecting dissolution of the functional composition.

BRIEF DESCRIPTION OF THE INVENTION

I have found that the drawbacks of powder use generally can be solved by an article of manufacture comprising a sealed water soluble container enclosing as little as about 200 grams, 450 grams, of a pelletized functional composition.

I have found the drawbacks of powdered warewashing detergent use can be solved by an article of manufacture comprising a sealed water soluble container enclosing typically at least about 900 grams of a pelletized warewashing functional composition.

Such an article can be used by directing water onto the article within a dispenser in order to form a concentrate and directing the concentrate to a use location.

The amount of pelletized composition contained in the article can vary according to a number of factors including but not limited to the following: the dispenser size, the intended use of the solution formed, the pellet composition, etc.

DETAILED DESCRIPTION OF THE INVENTION

Figure 1:
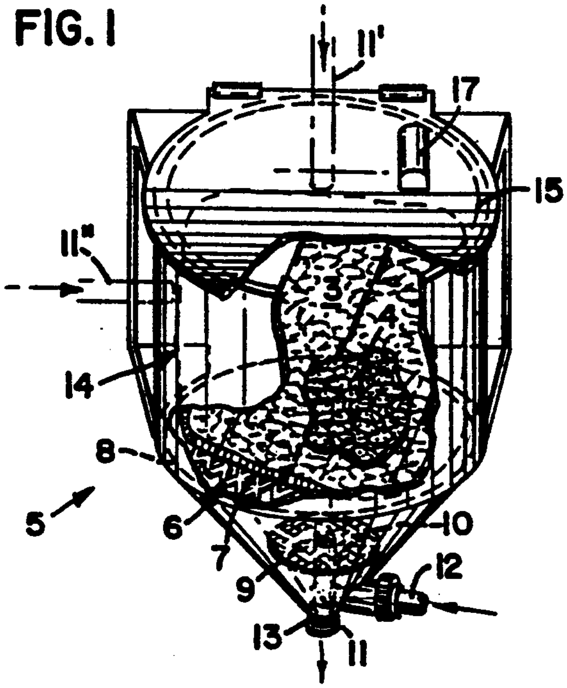
FIG. 1 is a front perspective view with portions thereof broken away for ease of installation of a dispenser in which is situated an article comprising a water soluble bag containing pelletized functional material.

Referring to the drawings, wherein, like numerals represent like parts throughout the several views; there is generally designated an article 16 comprising a sealed water soluble bag 3 containing a pelletized functional composition 4 situated in a dispenser 5. (See FIG. 1.)

Figure 2:
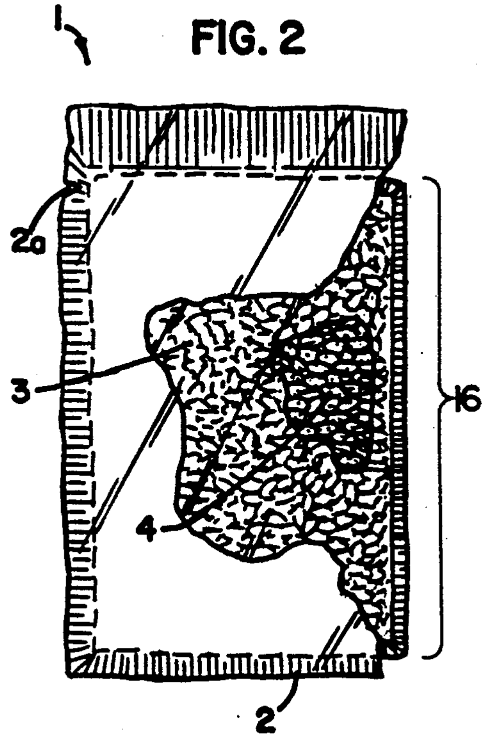
FIG. 2 is a front elevational view with portions thereof broken away of the article comprising a water soluble bag containing a functional pelletized material shown in FIG. 1 which further comprises a moisture impervious outerwrap.
Figure 3:
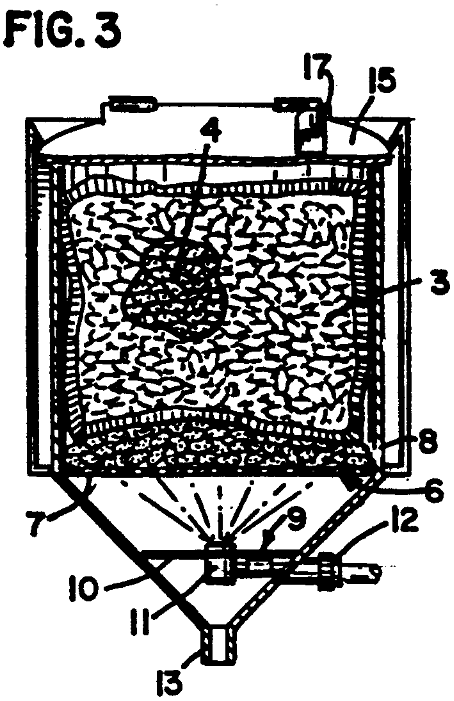
FIG. 3 is a front elevational view taken in section generally through the center of the dispenser in which is situated an article which is resting upon pelletized functional material which was previously enclosed in a water soluble container which has dissolved.

There is also generally designated an article 16 comprising a sealed water soluble bag 3 containing a pelletized functional composition 4 further contained within a removable water impervious outerwrap 2. (See FIG. 2.)

Water Soluble Film

The water soluble bag 3 of the article 16 of the present invention can be manufactured from a number of water soluble films which are available commercially.

Suitable water soluble film forming materials include but are not limited to the following:

Polyvinyl alcohol, polyvinyl acetate, methyl cellulose, hydroxyethyl cellulose, carboxymethyl cellulose, sodium carboxymethylhydroxyethyl cellulose, polyvinyl pyrrolidone, poly(alkyl)oxazoline, and film-forming derivatives of polyethylene glycol.

Polyvinyl alcohol which is preferred is an excellent film forming material, and has good strength and pliability under most conditions. Commercially available polyvinyl alcohol compositions for casting as films vary in molecular weight and degree of hydrolysis. For most film applications, molecular weights in the range of about 10,000 to about 100,000 are preferred. Hydrolysis is the percent by which acetate groups of the polyvinyl alcohol have been substituted with hydroxyl groups. For film applications, the range of hydrolysis typically is about 70% up to 100%. Thus, the term "polyvinyl alcohol" usually includes polyvinyl acetate compounds.

Such water soluble films and water soluble bags 3 manufactured therefrom are available from a number of commercial sources including the MONO-SOL® Division of Chris Craft Industries, Inc. A particularly useful type of a water soluble polyvinyl alcohol film is the 7-000 series of polyvinyl alcohol films which is available from the MONO-SOL® Division of Chris Craft Industries, Inc. The 7-000 series of polyvinyl alcohol films dissolve at a water temperature of about 34° F.-200° F. Such films are nontoxic and display a high degree of chemical resistance. A 0.002 inch+/−0.0002 inch thick 7-000 series polyvinyl alcohol film has the following properties and performance characteristics:

TABLE A

| Properties | Value |
|---|---|
| Clarity | Translucent |
| Yield (in./lb.) | 11,600 in./lb. |
| Hot bar heat seal range | 310-350° F., 30 psi, ¾ second dwell |
| Impulse heat seal range | 0.8-1.0 second, 80 psi, 1 second cooling |
| Water temperature range for solubility | 34° F.-200° F. |

TABLE A-continued

| Performance | Value | Test Method |
|---|---|---|
| Tensile strength (at break) | 6000 lb./sq. in. minimum | ASTM D822 |
| Tear strength | 1000 gm/mil minimum | ASTM D 1922 |
| Burst strength (Mullen) | Exceeds limit of equipment | TAPPI |
| Elongation | 450% min. | ASTM D 822 |

When selecting a water soluble film for use in the water soluble bag 3, one must take into account the water temperature at which one desires the water soluble bag 3 to dissolve. It is often desirable to choose a water soluble film that can dissolve at a low water temperature so that the invention functions properly over a wide range of water temperatures. It is not uncommon for the water used during a first wash cycle, for example, to have a lower temperature than water used in subsequent cycles.

Useful water soluble films for use in the water soluble bag 3 include those that dissolve at a water temperature of about 34° F. It is preferable, however, that the water soluble film for use in the water soluble bag 3 dissolve at a water temperature range of about 100° F.-200° F., for reasons of faster dissolution rate of the water soluble bag 3 and therefore faster dispensing of the product.

It is also important to select a water soluble film that does not react with the pellets 4 contained in the water soluble bag 3 formed therefrom. Other factors which should be considered when choosing a water soluble film to form the water soluble bag 3 include the following: the effect of the water soluble film on equipment including pumps, pipes and nozzles; the effect of the water soluble film on waste water; the toxicity of the water soluble film; the printability of the water soluble film; and properties which allow the water soluble film to be used on automated bag-making equipment (i.e. sealability, tensile strength and tear strength).

Printability is a factor since one may desire to print appropriate warnings and instructions on the water soluble bag 3.

Materials useful as the water soluble bag 3 should have the following minimum properties in order to be successfully utilized.

The material should have a maximum hot bar heat seal range of about 350° F., 30 psi, ¾ second dwell.

The material should have a maximum impulse seal range of about 1 second, 80 psi, 1 second cooling.

The material should have a minimum water temperature range for solubility of about 34° F. minimum.

The material should have a minimum tensile strength (at break) of about 6,000 lb./sq. in. according to the ASTM D822 test method.

The material should have a minimum tear strength of about 1,000 gm/mil according to the ASTM D 1922 test method.

The material should have a minimum elongation of about 450% according to the ASTM D822 test method.

Water Soluble Bag

The water soluble bag 3 can be made according to the general methods employed by the plastic film package producing industry. Such water soluble bags 3 used in the present invention are, however, typically of a larger size than the water soluble bags 3 traditionally manufactured. However, such water soluble bags 3 can be specially ordered from a number of sources as previously indicated. The water soluble bag 3 is preferably made of a water soluble polyvinyl alcohol film for cost reasons.

The water soluble bag 3 can be prepared from the water soluble film by placing two rectangular sheets of the water soluble film face-to-face so that the edges coincide and heat sealing or water sealing three edges using sealing equipment and methods known in the industry.

Alternatively, other sealing methods known in the art can be utilized.

The water soluble bag 3 is filled by pouring the weighed pelletized functional material 4 into the previously prepared water soluble bag 3 and finally heat sealing the fourth edge.

Polyvinyl alcohol film can be hygroscopic and its physical properties can change with changes in temperature and humidity.

Thus the article 16 comprising the sealed water soluble bag 3 containing the pelletized functional composition 4 should be protected from atmospheric humidity. The article 16 can be placed in the moisture impervious outerwrap 2 described further below.

The thickness of a wall of the water soluble bag 3 can range from about 20 to 90 microns, preferably about 25 to 50 microns for reasons of solubility, and most preferably about 50 microns for reasons of effective containment, rapid solubility and machineability.

The term "mil." as used herein is defined as follows: 1 mil=0.001 inch.

The water soluble bag 3 should have a minimum wall thickness greater than about 20 microns.

The water soluble bag 3 can be of whatever dimensions necessary in order to enclose the desired amount of pelletized functional composition.

The length of the water soluble bag 3 can range from about 6 to 18 inches, preferably about 8 to 16 inches, for reasons of automated filling and most preferably about 10 to 14 inches, for reasons of fit within the dispenser.

The width of the water soluble bag 3 can range from about 5 to 10 inches, preferably about 6½ to 8 inches for reasons of automated filling, and most preferably about 7 to 7½ inches for reasons of fit within the dispenser.

However, as currently envisioned with about 200 to 450 pounds as the expected minimum amount of pelletized composition that will be enclosed, the expected internal bag dimensions would typically be about 4 to 5 inches wide and about 5 to 7 inches long.

The water soluble bag 3 should have a minimum capacity of about 200 grams to 900 grams for reasons of customer convenience depending upon the nature of the pellet 4.

The amount of pelletized composition 4 that the water soluble container 3 would contain is dependent to an extent upon the pelletized composition and its intended use.

A water soluble container 3 intended for containing a pelletized silicate laundry detergent or a pelletized laundry softening agent should have a typical capacity of about 450 grams.

A water soluble container 3 intended for containing a pelletized silicate warewashing composition or a pelletized caustic warewashing composition should have a typical capacity of about 900 grams.

A water soluble container 3 intended for containing a pelletized presoak composition, a pelletized general purpose composition or a pelletized hard surface cleaner should have a typical capacity of about 200 grams.

Whenever a warewashing pelletized functional composition 4 is enclosed by the water soluble container 3, the water soluble container typically encloses at least about 900 grams of the pelletized functional composition 4.

The water soluble bag 3 should have a maximum capacity of about 3 kg–9 kg for reasons of customer convenience. Preferably, the water soluble bag 3 should have a capacity of about 1 kg–5 kg most preferably about 2–3 kg, depending upon the pelletized composition and its intended use.

The water soluble bag 3 should have a dissolution rate ranging from about 0.5 to 3 minutes at a water temperature of about 40° F. to 180° F. and a water pressure of about 25–30 psig.

The water soluble bag containing pelletized warewashing composition should have a capacity of about 900 grams–9 kg for reasons of customer convenience.

A typical water soluble bag 3 containing approximately four pounds of pelletized functional material 4 may have overall dimensions of about 8 inches by about 12 inches, with sealed margins of about ¼ to ½ inches.

A typical water soluble bag 3 containing approximately six pounds of pelletized functional material 4 may have inside dimensions of about 7½ inches by about 14 inches, with sealed margins of about ¼–½ inches.

These FIGURES are exemplary and may be varied depending upon the size of the dispenser and the particular use desired. The style of bag described above is known as a flat bag style. However, the use of other water soluble bag and water soluble container styles is possible for this invention.

The water soluble bag 3 should have dimensions such that it ·vill fit within a dispenser which it is designed to be used in conjunction with. Article 16 can be used in a variety of dispensers having a variety of sizes.

The dispenser should have a volume sufficient to contain at least one article 16 or more.

Pelletized Functional Material

The water soluble bag 3 contains enough pellets 4 in order to provide for multiple uses when the water soluble bag 3 is placed in a dispenser 5 and contacted with water.

The water soluble bag 3 contains a sufficient amount of pellets 4 to provide for at least about 2 uses, preferably about 4 to 20 uses for reasons of customer convenience and most preferably about 8 to 12 uses for reasons of customer convenience. Besides being dependent upon the amount of pelletized material, the number of uses is also dependent upon the water temperature, water pressure, pellet composition, water flow rate, water soluble bag composition and length of time the pellets are contacted with water during each use.

The mass of each pellet 4 typically ranges from about 2 to 30 grams, preferably about 5 to 15 grams for reasons of dissolution, and most preferably about 7 to 8 grams for reasons of preferred dissolution rate. If the 4 pellets are too large the rate .of dissolution will be too low. If the rate of dissolution is too low the solution formed will have too low of a concentration of dissolved functional material. If the pellets 4 are too small the rate of dissolution will be too high. If the rate of dissolution is too high the solution formed will have too high of a concentration of dissolved functional material. Typically, the detergent solution is transferred to a washing or cleaning apparatus which has a concentration monitoring device which controls the length of time water is sprayed through the nozzle 11 onto the pelletized material 4. If the solution enters at the machine in a highly concentrated form, the concentration could reach too high of a level before the sensor would detect the concentration and shut off the flow of water to the dispenser 5. In addition, concentrations that are too high could affect product performance.

A pellet 4 can have the following dimensions: a width ranging from about 5 to 30 mm, a height ranging from about 10 to 80 mm, and a depth ranging from about 10 to 30 mm. Preferably each pellet has about a width of about 19 mm, a height of about 30 mm and a width of about 15 mm for preferred dissolution.

As used herein, the terms "pellet" 4, "pelletized functional material" 4, and "pelletized functional composition" are used interchangeably. The terms also include but are not limited to the following: briquettes, tablets, pellets, nuggets, etc.

The terms "concentrate", "solution" and "use solution" are used interchangeably herein.

The shape of the pellets 4 used in the water soluble bag 3 of the present invention can vary. The shape of a pellet 4 can include any regular geometric shape including but not limited to the following: spherical, pyramidal, cubic, oblate spheroid, prismatic, cylindrical, etc.

Preferably, the pellets 4 used in the water soluble bag 3 of the present invention are spheroid shaped for reasons of manufacturing ease.

Moisture Impervious Outerwrap

In order to protect the article 16 of the present invention which comprises a water soluble bag 3 containing a multiple use amount of a pelletized functional material 4 during storage, shipping and handling, a water impervious outerwrap 2 can be provided to prevent damage from atmospheric moisture such as high humidity, rain and dew and from accidental contact with water by splashing or wet hands. This water impervious outerwrap 2 can be provided for either an individual article 16 or groups of articles 16, whichever appears to be most desirable for the individual case. Preferably, the water impervious outerwrap 2 is provided individually for each article 16 for reasons of customer safety and convenience and product protection. Once the water impervious outerwrap 2 is removed, the article 16 should either be protected from water contact or promptly inserted into the dispenser 5.

The terms "water impervious outerwrap" 2 and "moisture impervious outerwrap" are used interchangeably herein.

Suitable materials for the water impervious outerwrap 2 include but are not limited to the following: polyolefin films such as polyethylene or polypropylene, Kraft paper which can be moisture-proofed with polyethylene, moisture-proofed cellophane, glassine, metal foils, metallized polymer films, polyester, polyvinyl chloride, polyvinylidene chloride or waxed paper and combinations of these materials as in laminates. The selection of material for the water impervious outerwrap 2 is determined by a number of factors including the cost of the material and the strength required. Preferably, the water impervious outerwrap 2 comprises a polyethylene film for reasons of cost of material and moisture barrier properties.

A preferred polyethylene film available from several manufacturers for use in the production of the water impervious outerwrap 2 has the following properties:

| Structure | |
|---|---|
| Antistatic coating | |
| High density polyethylene | 20% |
| White linear low density polyethylene | 60% |
| Surlyn (sealant layer) | 20% |

Caliper: absolute minimum thickness 2.70 mils.

| | Value |
|---|---|
| Properties | |
| Clarity (% light transmission) | 34.4% |
| Yield (sq. in./lb.) | 10,561 |
| Heat seal range | 200–250° F., 60 psi, ½ second dwell |
| Water vapor transmission rate WVTR (gm/100 sq. in./24 hours at 100° F., 90% R.H.) | 0.18 |
| Oxygen transmission test $O_2$ trans (cc/100 sq. in. 24 hours/1 atm./73°, 50% R.H.) | 95.0 |
| Performance Properties | |
| Tensile strength (at break) | 3300 min.-3900 max. psi |
| Tear strength | 616 g MD/536G MD |
| Elongation | 663% MD/620% CD |
| Dart impact (50% failure) | 214G |

Materials useful as the water impervious outerwrap 2 should have certain minimum properties in order to be successfully utilized as the water impervious outerwrap 2:

The material should have a water vapor transmission rate (WVTR) of no more than about 0.5 gm/100 sq. in./24 hours at 100° F., 90% R.H.

The material should have a minimum tensile strength (at break) of about 3,000 psi.

The water impervious outerwrap 2 should have a minimum wall thickness of about 35 microns.

The water impervious outerwrap 2 should have a minimum capacity of about 200 grams.

The disposal of the moisture impervious outerwrap 2 presents no health or pollution hazard as does the disposal of the normal package for potentially harmful material. Since the moisture impervious outerwrap 2 has not contacted the contents of the water soluble bag 3, no residual amounts of the potentially harmful contents remain in it. The water soluble bag 3 itself, of course, completely dissolves and, therefore, creates no disposal problems.

Bags to serve as the moisture impervious outerwrap 2 are made by the same method as for the water soluble film bags 3 by heat sealing three edges except that the films are typically cut to be about 1 to 3 inches wider and about 1 to 4 inches longer than the water soluble bag 3 which it contains.

A margin of the moisture impervious outerwrap 2, preferably the side margin, can contain a slit 2a which extends part way through the margin to aid the user in opening the moisture impervious outerwrap 2.

A polyethylene water impervious outerwrap 2 having the following dimensions can be used to enclose a water soluble bag 3 containing 4 lbs. of pelletized functional composition 4.

| Dimensions: | |
|---|---|
| Inside dimension (not including seal area) | |
| Width (opening) | 8¾" |
| Length | 12¾" |
| Thickness | 0.0027" min. |
| Dimensional tolerance | +/− ¼" |
| Style: Flat bag style | |
| Seals: 3-side-seal with 10 mm seals. | |

The fourth side is sealed by means of heat in order to provide at least about a 10 mm margin.

The water impervious outerwrap 2 can comprise a variety of forms including but not limited to the following: a box, a carton, an envelope, a bag, a tub, a pail, a can and a jar. Preferably the water impervious outerwrap comprises a flexible bag for reasons of ease of handling and storage.

The outside of the moisture impervious outerwrap 2 can have printed thereupon directions for use and appropriate warnings.

Method of Use

The enclosed pelletized functional material 4 is typically used by placing the article 16 inside the dispenser 5 after removing the water impervious outerwrap 2. The water soluble bag 3 of the present invention contains too large of an amount of pelletized functional material 4 to be placed directly in a warewashing or cleaning apparatus for a single use cycle.

The article 16 of the present invention can be used in various types of dispensers. Preferably the article 16 of the present invention is used in a dispenser 5 comprising a dispenser housing 14, a perforated grate 6, a safety grate 9, and a nozzle 11. (See FIG. 1.)

The dispenser 5 typically has a hinged lid 15 or other access means in order to allow the insertion of the article 16 into the dispenser 5.

The dimensions of the dispenser 5 can vary depending upon the size and number of articles 16 that one desires the dispenser 5 to contain.

The perforated grate 6 is typically situated in the lower portion of the dispenser housing 14. The perforated grate 6 can be cooperatively connected to the walls of the dispenser housing 14 or it can rest directly on a narrow ledge 8 situated around the inner periphery of the dispenser housing 14.

The perforated grate 6 serves to support the water soluble bag 3 containing the pellets 4 within the dispenser 5.

The perforated grate 6 is preferably flat in order to facilitate contact of the water soluble bag 3 and pellets 4 with the water being sprayed from below.

The perforated grate 6 contains a number of openings 7. The openings 7 must be of a sufficient size and number to allow an adequate amount of water to spray through the perforated grate 6 in order to dissolve the water soluble bag 3 and the pellets 4 contained therein. To facilitate dispensing it is preferable that the perforated grate 6 contain as many openings 7 as possible in order to facilitate contact of water from the nozzle 11 below with the pellets 4 and the water soluble bag 3 which are supported by the perforated grate 6. The openings 1 should not be so numerous that the perforated grate 6 is to weak to support the weight of the water soluble bag 3 and pellets 4 or to permit the pellets to pass through the grate openings.

As used herein, a "perforated grate" includes but is not limited to the following: a screen, a grate having a plurality of holes or openings, and a trap having a plurality of holes or openings.

The openings 7 contained in the perforated grate 6 can vary in size. Preferably each opening 7 has an area ranging from about 0.5 to 5 $cm^2$, preferably about 1 to 4 $cm^2$ for reasons of product support and most preferably about 1 to 3 $cm^2$ for reasons of most effective dispensing.

The openings 7 should be smaller than the pellets 4 contained in water soluble bag 3 so that the pellets 4 do not fall through the openings 7 in perforated grate 6 as soon as the water soluble bag 3 dissolves.

The openings 7 in the perforated grate 6 can be of various shapes including but limited to the following: circular, oval, square, rectangular, slit shaped, cylindrical, diamond. Preferably, the openings 7 are diamond shaped for reasons of ease of manufacture.

The perforated grate 6 can comprise a number of materials including but not limited to the following: metal and plastic. Preferably, the perforated grate 6 comprises metal for reasons of support and ease of manufacture. A preferred perforated grate 6 comprises an expanded metal grate 6.

A safety grate 9 is typically situated below the perforated grate 6. The safety grate 9 serves to collect any subdivided pellet 4 particles which have been eroded to a size small enough to fall through an opening 7 contained in perforated grate 6. The safety grate 9 typically has a size such that a particle comprising about 5 mm×5 mm or larger cannot fit through the openings 10 contained in safety grate 9.

The safety grate 9 can comprise a number of materials including but not limited to the following: plastic, metal, and wire mesh.

Preferably, the safety grate 9 comprises plastic for economic reasons.

The safety grate 9 prevents pellet 4 particles from entering and clogging the line 13 leading from the dispenser 5 to the unit such as a warewashing machine that uses the use solution. Water which has been sprayed through nozzle 11, through perforated grate 6 and onto the water soluble bag 3 and pellets 4 supported by perforated grate 6 dissolves the pellets 4 resulting in the formation of a use solution. The use solution thus formed flows back down through the perforated grate 6 and safety grate 9 and out of the dispenser 5 through line 13. Pellet 4 particles which have fallen onto safety grate 9 are dissolved upon- contact with the use solution as it flows out of the dispenser 5.

A nozzle 11 or other fluid dispersing means is typically positioned such that water or other dissolving fluid can be directed onto the water soluble bag 3 and pellets 4 resting on the perforated grate 6 in order to form a solution.

Nozzle 11 can be situated below perforated grate 6 in such a manner that water can spray through nozzle 11 onto article 16 resting on perforated grate 6 from below. Alternatively, the nozzle 11 contained in the dispenser 5 can be situated such that it sprays water onto the water soluble bag 3 from an alternate direction such as the top 11' or side 11" rather than below. Thus, the nozzle 11 can be situated in a number of positions including but limited to the following above 11' the water soluble bag 3, to the side 11" of the water soluble bag 3, and below 11 the water soluble bag 3, etc.

A valve 17 serves to prevent water from spraying through nozzle 11 whenever lid 15 is open. The use of such a valve 17 serves as a safety measure to protect the user from being sprayed with water or solution. Suitable valves include but are not limited to the following: a solenoid valve.

In a preferred mode the dispenser 5 has the following dimensions and characteristics:

Preferably, the perforated grate 6 is circular and has a diameter of about 17 cm.

Preferably the openings 7 in the perforated grate 6 are diamond shaped and have an area of about 1 by 2.5 cm.

Preferably, the safety grate 9 is circular and has a diameter of about 7 cm.

Preferably, the openings 10 in the safety grate 9 have an area of about 5 by 5 mm.

Preferably, the safety grate 9 is situated about 4 centimeters below the perforated grate 6.

Preferably, the nozzle 11 is situated about 1 cm. above the safety grate 9.

Preferably, the dispenser housing 14 comprises an upper cylindrical housing having a funnel shaped bottom portion 14*b*. An inlet 12 is connected to dispenser 15 at the funnel shaped bottom portion 14*b* of the dispenser housing 14. Together the inlet 12 and the nozzle 11 comprise the water or fluid access means.

Preferably, the safety grate 9 and nozzle 11 are situated in the funnel shaped bottom portion 14*b* of the dispenser housing 14. The perforated grate 6 rests upon a narrow ledge 8 having a width of about 3 mm situated around the inner periphery of the dispenser housing 14 at the point where the cylindrical portion 14*a* of the dispenser housing 14 meets the funnel shaped portion 14*b*.

Preferably, the cylindrical portion 14*a* of the dispenser housing 14 has a diameter of about 18 cm. Preferably, the top of the cylindrical portion 14*a* is angled such that it has a height of about 14 cm in front and a height in the rear portion where the hinges 15*a* and 15*b* of lid 15 are situated. Preferably, the volume of the dispenser above the perforated grate 6 is 4,000–6,000 cubic centimeters.

The rate of dissolution of the water soluble bag 3 and the pellets 4 contained therein is dependant upon a number of factors including the water temperature and the pressure of the water sprayed upon the water soluble bag 3 and the pellets 4 contained therein. The higher the water pressure the higher the dissolution rate of the water soluble bag 3 and pellets 4. Likewise, the higher the water temperature the higher dissolution rate of the water soluble bag 3 and pellets 4. The size of the pellet 4 itself also affects the dissolution rate.

The smaller the pellet 4 the higher its dissolution rate. Conversely, the larger the pellet 4 the lower its dissolution rate.

A pellet's 4 dissolution rate is also affected by whether the pellet 4 has been previously wetted. If a pellet 4 has been wetted during a pervious solution formation cycle then it will have a higher dissolution rate during subsequent solution formation cycles.

The dissolution rate of a pellet 4 is also affected by the pellet's 4 density. The higher the density of a pellet 4, the slower it dissolves.

The pellets 4 used in the water soluble bag 3 of the present invention can have a density ranging from about 1.0 to 3.0 gm/ml, preferably about 1.7 to 2.0 gm/ml for reasons of dispensing and most preferably 1.8 to 1.9 gm/ml for reasons of friability and dispensing.

A warewashing pellet 4 for use in the article 16 of the present invention has a dissolution rate such that it does not completely dissolve in less than about 7–10 minutes when contacted with water having a temperature of the range of water typically used in consumer dishwashers.

The rate of dissolution is also dependent upon the composition of the water soluble bag 3 itself and upon the compositions of the pellets 4 contained therein.

The water soluble bag of the present invention should dissolve within about 0.5 to 3 minutes upon contact with water having a temperature of about 40° F. to 180° F. or higher and a pressure of about 25 to 30 psig.

The article 16 should dissolve at a rate such that the desired concentration of functional material at the use location can be obtained.

Preferably, the pelletized functional material is contacted with a water spray having a sufficient temperature and pressure in order to form a concentrate which can be dispensed to its use location within about 0.5–5 minutes. Preferably, the dispensing time necessary in order to achieve the desired concentration of functional material at the use location is less than 3 minutes.

The temperature of the water sprayed through the nozzle 11 onto the article 16 can vary depending upon the composition of the water soluble container 3 and the pelletized functional material 4.

Preferably, the water has a minimum temperature of about 34° F. in order to dissolve the water soluble container. The minimum water temperature is also dependent upon the composition of the pelletized functional material.

Preferably, the temperature of the water sprayed through nozzle 11 onto the article 16 according to the method of this invention can range from about 80° to 160° F., more preferably about 100 to 140 degrees F., and most preferably about 110 to 140 degrees F. for reasons of effective dispensing.

The pressure of the water sprayed through nozzle 11 onto the article 16 according to the method of this invention can vary. Preferably, the water pressure range from about 12 to 60 lbs./in.$^2$ most preferably about 25 to 30 lbs./in.$^2$ for reasons of effective dispensing.

The contact of water with the pelletized functional material 4 within the dispenser 5 results in the formation of a solution. Such solution is directed be means of a line 13 into a washtank, bucket or wherever the solution is needed.

An ionic sensor or other concentration monitoring device can be used to determine the concentration of solution formed by action of the water on the pellets 4 contained within the dispenser 5. The ionic sensor serves to regulate the length of time water is sprayed through the nozzle 11, thus insuring a high accuracy with regards to the functional material solution concentration.

It is possible that the article 16 of the present invention could be used in various other dispensers including but not limited to the following: water in reservoir dispensers and hydraulic dispensers.

The dispenser 5 previously described is preferred in that the user by means of the ionic sensor device or other concentration monitoring device can accurately control the concentration of functional material contained in the solution.

The dispenser 5 used to dissolve the article 16 of the present invention can be used by itself in order to form a solution from the pellets 4 contained in the water soluble bag 3. Alternatively, the dispenser 5 can be mounted directed onto a machine such as a warewashing machine, laundry machine, etc. which the dispenser 5 is being used in conjunction with. Alternatively, the dispenser 5 can be situated on the floor next to the machine it is being used in conjunction with, or mounted on a nearby wall.

Pelletized Functional Composition

The article 16 of the present invention can contain a multiple use amount of a pelletized functional material 4 including but not limited to a fabric treatment composition, a warewashing composition, a laundry composition, a pot and pan cleaner or presoak composition, a silverware cleaner or presoak composition, a floor cleaner composition, a rinse additive composition, a disinfectant composition, a general purpose cleaner composition, etc. The pelletized materials of the invention are room temperature solids. The materials are solidified by a variety of mechanisms, including compressive molding, compressive pelletizing, casting, hydration hardening, the user of organic hardening agents, etc.

1. LAUNDRY COMPOSITION

Formula I comprises a detergent pellet whereas Formula II comprises a fabric softening pellet which also serves to lower the pH (i.e. acidify or sour) the water in which the pellet is dissolved.

| | | Narrow | Preferred | Broad |
|---|---|---|---|---|
| | FORMULA I SILICATE LAUNDRY DETERGENT PELLET | | | |
| 1. | Alkali metal silicate | 48–52 | 30–60 | 5–90 |
| 2. | Alkali metal hydroxide | 20–50 | 20–60 | 0–80 |
| 3. | Sequestering agent | 15–30 | 10–60 | 1–90 |
| 4. | Antiredeposition agent | 2–4 | 2–8 | 0–10 |
| 5. | Dye | 0.018–0.022 | 0.005–0.05 | 0–0.5 |
| | Optional Ingredients | | | |
| 6. | Optical brightener | | 0.1–1.0 | 0–5 |
| 7. | Nonionic surfactant | | 20–30 | 0–50 |
| 8. | Anionic surfactant | | 5–15 | 0–20 |
| 9. | Fragrance | | 0.05–0.5 | 0–1.0 |
| 10. | Sodium carbonate | | | 0–80 |
| 11. | Water of hydration | | | 0–30 |
| | FORMULA II LAUNDRY SOFTENING PELLET | | | |
| 1. | Moderate pH acid | | 70–90 | 50–100 |
| 2. | Quaternary surfactant | 20–40 | 10–50 | 50–100 |
| 3. | Optical brightener | | 0.1–0.4 | 0–2 |
| 4. | Fragrance | | 0.1–0.5 | 0–2 |
| 5. | Iron control agents | | 5–15 | 0–20 |
| 6. | Water of hydration | | | 0–43 |
| 7 | Enzyme | | | 0–5 |

1(a). LAUNDRY COMPOSITION—FORMULA I—LAUNDRY DETERGENT PELLET

Alkali Metal Silicate: The laundry detergent pellet may comprise about 0 to 100 wt-% of an alkali metal silicate, preferably about 30 to 60 wt-% for reasons of detergency and dispensing ability and most preferably about 48–52 wt-% for reasons of solubility.

The alkali metal silicate can be represented by the formula $(M_2O)_x:(SiO_2)_y$ wherein x is the number of moles of alkali metal oxide and y is the number of moles of silicon dioxide. The ratio of x:y can range from about 0.25:1 to 5:1, preferably about 1:1 to 3:1 for reasons of detergency and dispensing ability, and most preferably about 1:1 to 2:1 for reasons of detergency and a reduction in fabric damage.

Alkali Metal Hydroxide: The laundry detergent pellet may comprise about 0 to 80 wt-% of a source of an alkali metal hydroxide, preferably about 20 to 60 wt-% for reasons of solubility and detergency and most preferably about 20 to 50 wt-% for reasons of effective cleaning. Suitable alkali metal hydroxides include: potassium hydroxide and sodium hydroxide.

Sequestering Agents: The laundry detergent pellet may comprise about 0 to 100 wt-% of a sequestering agent, preferably about 10 to 60 wt-% for reasons of chelating water hardness and improving soil removal and most preferably about 15 to 30 wt-% for reasons of effective sequestering. Suitable sequestering agents include but are not limited to the following: alkali metal phosphates such as pyrophosphates, tripolyphosphates, sodium aluminosilicates, sodium carbonate, and also organic sequestering agents, such as EDTA, NTA, phosphonates, polyacrylic acid, copolymers of acrylic acid, copolymers of itaconic acid, etc. Preferably the sequestering agent comprises sodium tripolyphosphate for reasons of cost.

Dye: The laundry detergent pellet may also comprise about 0–0.5 wt-% of a dye, preferably about 0.005–0.05 wt-%, and most preferably about 0.018–0.022 wt-%.

Antiredeposition Agent: The laundry detergent pellet may also comprise about 0–10 wt-% of an antiredeposition agent, preferably 2–8 wt-% for reasons of suspending soil and preventing deposition on fabric and most preferably about 2–4 wt-% of an antiredeposition agent for reasons of effective soil suspension. Suitable antiredeposition agents include but are not limited to the following: substituted celluloses such as carboxymethyl cellulose, polyvinyl pyrrolidine, polymeric polycarboxylate materials, and ethoxylated amides. Preferably the antiredeposition agent comprises carboxymethyl cellulose for reasons of efficacy.

Optical Brightener: The laundry detergent pellet may also comprise about 0–5 wt-% of an optical brightener, preferably about 0.1–1.0 wt-%.

Nonionic Surfactant: The laundry detergent pellet may also comprise about 0–50 wt-% of a nonionic surfactant, preferably about 10–40 wt-%, and most preferably about 20–30 wt-%. Suitable nonionic surfactants include but are not limited to the following: propoxylated and/or ethoxylated alkyl phenols, propoxylated and/or ethoxylated aliphatic alcohols and carboxylic esters. For reasons of effective detersiveness, low cost, ease of availability, and low foam, the preferred nonionic surfactants are ethoxylated nonyl phenols having 9–10 moles of ethoxylate and $C_{12}$–$C_{15}$ linear alcohols having 7–9 moles of ethoxylate.

Anionic Surfactant: The laundry detergent pellet may also comprise about 0–20 wt-% of an anionic surfactant, preferably about 5–15 wt-% for reasons of particulate soil dispersion. Suitable anionic surfactants include but are not limited to the following: linear alkyl benzene sulfonate, alcohol sulfate, alcohol ether sulfate and alpha olefin sulfonates. Preferably the anionic surfactant comprises a linear alkyl benzene sulfonate for reasons of cost and efficacy.

Sodium Carbonate: The laundry detergent pellet may also comprise about 0–80 wt-% sodium carbonate.

Fragrance: The laundry detergent pellet may also comprise about 0–1.0 wt-% of a fragrance, preferably about 0.05–0.5 wt-%.

Water of Hydration: The laundry detergent pellet may also comprise about 0–30 wt-% water of hydration, preferably about 0 to 15 wt-% for reasons of ensuring a strong pellet that resists breakage and dusting and concentrating the product actives.

EXAMPLE 1

The following example demonstrates the good dissolution rate of a water soluble bag of the present invention containing a pelletized silicate laundry detergent functional composition. A water soluble bag having the following dimensions: 7½ inches length, 10 inches width and a thickness of 1.5 mils and comprising a polyvinyl alcohol film bag purchased from Chris Craft Industries, Inc. having the properties set forth in Table A containing 3 lbs. of pellets is inserted into a dispenser. The silicate laundry detergent pellets have the following composition:

| Ingredients | | Wt-% |
|---|---|---|
| 1. | Sodium metasilicate | 40 |
| 2. | Sodium hydroxide | 27 |
| 3. | Sodium tripolyphosphate | 20 |
| 4. | Carboxymethyl cellulose | 3 |
| 5. | Dye | 0 |
| 6. | Optical brightener | 1 |
| 7. | Nonyl phenol ethoxylate with 9.5 moles of ethoxylate | 3 |
| 8. | Linear alkyl benzene sulfonate | 1 |
| 9. | Fragrance | 0 |
| 10. | Water of hydration | 5 |

The water soluble bag containing the pellets is contacted with water having a temperature of 135°-155° F. in order to form a solution. The solution is formed and transferred to a 30 gallon tank containing 25 gallons of fresh water. By means of an ionic sensor it is determined that it takes less than about 3 minutes for the tank to reach the desired concentration.

1(b). LAUNDRY COMPOSITION—FORMULA II—LAUNDRY SOFTENING PELLET

Formula II comprises a laundry softening pellet.

Moderate pH Acid: The laundry softening pellet can comprise about 50–100 wt-% of a moderate pH acid, preferably about 70–90 wt-% for reasons of reducing linen pH to prevent skin irritation and enhance rinsing of water hardness salts. Suitable moderate pH acids include but are not limited to the following: ammonium silico fluoride, sodium silicoflouroide, tartaric acid, citric acid, oxalic acid, sodium acid fluoride and ammonium acid fluoride. Preferably the moderate pH acid comprises ammonium silico fluoride for reasons of solubility, toxicity and cost.

A moderate pH acid is an acid wherein at a concentration in water of the acid of about 0.25 wt-%, a pH of about 2 and ideally above about 4 is obtained.

Quaternary Surfactant

The laundry softening pellet also comprises about 50–100 wt-%, preferably about 10–50 wt-%, and most preferably about 20–40 wt-% of a quaternary surfactant.

Suitable quaternaries include but are not limited to the following: quaternary ammonium chlorides, quaternary ammonium methyl sulfate, imidazolinium-type quaternaries, dialkyl dimethyl quaternaries, monoalkyl trimethyl quaternaries, and diamide amine based quaternaries. Preferably the quaternaries utilized are solid and have a melting point above about 120° F. Quaternaries used in the present invention should have fabric softening capabilities and static reduction capabilities. Preferably the quaternary comprises distearyl dimethyl ammonium chloride for reasons of efficacy and melting point.

Optical Brightener: The laundry softening pellet may also comprise about 0–2 wt-% of an optical brightener, preferably about 0.1–0.4 wt-%.

Fragrance: The laundry softening pellet may also comprise about 0–2 wt-% of a fragrance, preferably about 0.1–0.5 wt-%.

Iron Control Agent: The laundry softening pellet may also comprise about 0–20 wt-% of an iron control agent, preferably about 5–15 wt-% for reasons of reducing yellowing caused by iron deposits. Suitable iron control agents include but are not limited to the following: oxalic acid, citric acid, such as HEDP (hydroxyethylene diphosphonic acid), sodium or ammonium acid fluoride and organic amino polycarboxylated compounds such as nitrilotriacetic acid and ethylene diamine diacetic acid.

Water of Hydration: The laundry softening pellet may also comprise about 0–43 wt-% water of hydration, preferably about 0–15 wt-% for reasons of reducing the percentage of inactive materials in the formulation.

Enzyme: The laundry softening pellet may also comprise about 0–5 wt-% of an enzyme, preferably about 1–4 wt-% for reasons of protein and starch stain removal. Suitable enzymes include but are not limited to the following: amylase, protease, lipase and cellulase.

The enzyme may be encapsulated. Suitable materials for the encapsulation of the enzyme include but are not limited to the following: inorganic salts, substituted celluloses, polyethylene glycols and waxes.

EXAMPLE 2

The following example demonstrates the good dissolution rate of a water soluble bag of the present invention containing a laundry softening pelletized functional composition. A water soluble bag having the following dimensions: 7½ inches length, 6 inches width and a thickness of 1.5 mils and comprising a polyvinyl alcohol film bag purchased from Chris Craft Industries, Inc. having the properties set forth in Table A containing 1 lb. of pellets is inserted into a dispenser.

The laundry softening pellet composition is as follows:

| Ingredients | | Wt-% |
|---|---|---|
| 1. | Ammonium silico fluoride | 60 |
| 2. | Quaternary surfactant distearyl dimethyl ammonium chloride | 25 |
| 3. | Optical brightener | 1 |
| 4. | Fragrance | 0.5 |
| 5. | Iron control agent - citric acid | 13.5 |
| 6. | Water of hydration | |

The water soluble bag containing the pellets is contacted with water having a temperature of 135°-155° F. in order to form a solution. The solution is transferred to a 30 gallon tank containing 25 gallons of fresh water. By means of an ionic sensor it is determined that it takes less than 3 minutes for the tank to reach the desired concentration.

2. WAREWASHING COMPOSITION

We believe that a multiple use amount of a pelletized warewashing composition may be used in the water soluble bag of the present invention.

Formula I comprises a metasilicate based warewashing composition whereas Formula II comprises a caustic based warewashing composition.

2(a). WAREWASHING COMPOSITION—FORMULA I—METASILICATE BASED

| Raw Material | Narrow | Broad | Preferred |
|---|---|---|---|
| 1. Sequestering agent | | 10–70 | 30–40 |
| 2. Alkali metal silicate | 40 | 10–70 | 30–60 |
| 3. Secondary sequestering agent | | 0–10 | 0–4 |
| 4. Filler | 18–22 | 0–60 | 0–40 |
| 5. Bleaching source | 2–3 | 0.1–10 | 1–6 |
| 6. Defoaming surfactant | 0–1 | 0–10 | 0–4 |
| 7. Dye | | 0–10 | |
| 8. Fragrance | | 0–10 | |

Sequestering Agent: The pelletized metasilicate based warewashing composition of this invention preferably comprises about 10 to 70 wt-%, of a sequestering agent, preferably about 30 to 40 wt-% for reasons of effective sequestering of hardness ions.

The service water commonly employed in cleaning baths contains substantial proportions of hardness ions, most commonly calcium and magnesium ions, which can react with detergent components to decrease cleansing effectiveness and/or leave unsightly deposits upon the substrate being cleaned. Sequestrants act to prevent or delay crystal growth of calcium or magnesium compounds and thereby eliminate their reaction with other components and/or their precipitation.

Useful inorganic sequestering agents include but are not limited to the following: condensed phosphate compositions such as water soluble alkali metal orthophosphates, polyphosphates, pyrophosphates and metaphosphates. Preferably the sequestering agent is an inorganic sequestering agent for reasons of cost.

For reasons of cost, sodium tripolyphosphate is the preferred inorganic sequestering agent.

Alkali Metal Silicate: The pelletized metasilicate based warewashing composition of this invention can comprise about 10 to 70 wt-% of an alkali metal silicate. Preferably the pelletized warewashing composition comprises about 30 to 60 wt-% of an alkali metal silicate for reasons of supplying alkalinity, and most preferably about 40 wt-% of an alkali metal metasilicate for reasons of supplying sufficient alkalinity.

Alkali metal silicates are the reaction product of an alkali metal oxide ($M_2O$) and silicon dioxide ($SiO_2$) and have the general chemical formula $(M_2O)_x:(SiO_2)_y$ wherein x and y indicate the molar ratio of alkali metal oxide to silicon dioxide.

Methods of manufacturing alkali metal silicates having various x:y mole ratios are well know as demonstrated by the general disclosure in the Kirk-Othmer *Encyclopedia of Chemical Technology*, 2d Ed., Vo. 18, pp. 139–141. The desired properties and benefits of the pelletized warewashing composition described herein can be obtained using an alkali metal silicate having an x:y ratio of about 1:1–3:1, preferably 1:1. At these ratios, the alkali metal silicate has sufficient alkaline character to clean effectively and sufficient silicon dioxide to protect aluminum, china, glassware, etc. from the etchant effect of basic components in the composition.

For reasons of high cleaning performance, delicate ware protection and low cost, the most preferred alkali metal silicate is sodium metasilicate having an $Na_2O$:-$SiO_2$ ratio of about 1:1.

Secondary Sequestering Agent: The pelletized metasilicate based warewashing composition of this invention can comprise about 0 to 10 wt-% of a secondary sequestering agent. Preferably, the pelletized warewashing composition comprises about 0 to 4 wt-% of an secondary sequestering agent for reasons of better product performance.

Suitable secondary sequestering agents include a polyelectrolyte such as polymeric polycarboxylic acids of molecular weight 1,000–3,000, EDTA (ethylene diamine tetra acetic acid), NTA (nitrilotriacetic acid), citric acid.

Preferably the secondary sequestering agent is an organic sequestering agent for reasons of product performance.

Preferably the secondary sequestering agent is sodium polyacrylate for reasons of performance.

Filler: The pelletized metasilicate based warewashing composition of the present invention can also comprise about 0 to 60 wt-% of a filler. Preferably the pelletized warewashing composition comprises about 0–40 wt-% of a filler for reasons of cost, and most preferably about 18–22 wt-% for reasons of cost.

Suitable fillers include but are not limited to the following: sodium carbonate, and sodium sulfate.

The more fillers the pellet contains, the less expensive the pellet. Preferably, the filler comprises sodium carbonate for economic reasons and the fact that sodium carbonate services as an additional source of alkalinity.

Bleaching Source: The pelletized metasilicate based warewashing composition may also comprise about 0.1–10 wt-% of a bleaching source. Preferably the pelletized warewashing composition contains about 1–6 wt-% of a bleaching source, for reasons of detaining, and most preferably about 2–3 wt-% for reasons of cost coupled with good destaining.

Bleaches suitable for use in the pelletized warewashing composition include any of the well known bleaching agents capable of removing stains from such substrates as dishes, flatware, pots and pans, textiles, countertops, appliances, flooring, etc. without significantly damaging the substrate. A nonlimiting list of such bleaches include bleaches such as hypochlorites, chlorites, chlorinated phosphates, chloroisocyanates, chloroamines, etc.; and peroxide compounds such as hydrogen peroxide, perborates, percarbonates etc. Preferred bleaches include those bleaches which liberate an active halogen species such as $Cl^+$, $Br^+$, $OCl^-$, or $OBr^-$ under conditions normally encountered in typical cleaning processes. Most preferably, the bleaching agent releases $Cl^+$ or $OCl^-$. A nonlimiting list of useful chlorine releasing bleaches includes calcium hypochlorite, lithium hypochlorite, chlorinated trisodium phosphate, sodium dichloroisocyanurate, potassium dichloroisocyanurate, pentaisocyanurate, trichloromelamine, sulfondichloro-amide, 1,3-dichloro -5,5dimethyl hydantoin, n-chlorosuccinimide, n,n'-dichloroazodicarbonimide, n,n-chloroacetyl urea, n,n'-dichlorobiuret, trichlorocyanuric acid, and hydrates thereof.

Because of their higher activities and high bleaching efficiencies the most preferred bleaching agents are the alkali metal salts of dichloroisocyanurates and the hydrates thereof.

Defoaming Surfactant: The pelletized metasilicate based warewashing composition of the present invention may also comprise about 0–10 wt-% of a defoaming surfactant.

Preferably the warewashing composition contains 0–4 wt-% of a defoaming surfactant for reasons of defoaming performance and most preferably about 0–2 wt-% for reasons of maximum defoaming without interfering with product performance.

A defoamer is a chemical compound with a hydrophobe/hydrophile balance suitable for reducing the stability of protein foam. The hydrophobicity can be provided by an oleophilic portion of the molecule; e.g., an aromatic alkyl or alkyl group, an oxypropylene unit or oxypropylene chain, or other oxyalkylene functional groups other than oxyethylene; e.g., tetramethylene oxide. The hydrophilicity can be provided by oxyethylene units, chains, blocks and/or ester groups; e.g., organophosphate esters; salt-type groups, or salt-forming groups. Typically, defoamers are nonionic organic surface-active polymers having hydrophobic groups, blocks or chains and hydrophilic ester groups, blocks, units or chains; but anionic, cationic, and amphoteric defoamers are known. For a disclosure of nonionic defoaming surfactants, see U.S. Pat. No. 3,048,548, issued Aug. 7, 1962 (Martin et al), U.S. Pat. No. 3,334,147, issued Aug. 1, 1967 (Brunelle et al, and U.S. Pat. No. 3,442,242, issued May 13, 1969 (Rue et al). Phosphate esters are also suitable, e.g. esters of the formula $RO-(PO_3M)-_nR$, wherein n is a number ranging from 1 to about 60, typically less than 10 for cyclic phosphates, M is an alkali metal and R is an organic group or M, with at least one R being an organic group such as an oxyalkylene chain.

Suitable defoaming surfactants include but are not limited to the following: ethylene oxide/propylene oxide block nonionic surfactants, fluorocarbons, and alkylated phosphate esters.

Preferably the defoaming surfactant comprises an alkyl sulfate ester for economic reasons.

Additional Ingredients: The pelletized warewashing composition may also further comprise 0–10 wt-% a dye and 0–10 wt-% fragrance.

The pelletized functional composition of the present invention can be manufactured by a number of processes, included but not limiting to the following: a batch process and a continuous process.

In the batch process, sodium metasilicate, low density tripolyphosphate, surfactant, soda ash, and dry polyacrylate are added in any order to a ribbon blender or a Nauta mixer. The last item added is the chlorine source (sodium dichloroisocyanurate dihydrate). The various dry ingredients are mixed for 5–10 minutes, collected in drums and fed through a belt feeder to the pelletizer.

In the continuous process, each dry ingredient is fed in the proper proportions to a 15 foot ribbon blender at a combined flow rate of 1,000 pounds per hour. The ribbon blender is used as a continuous mixer, in order to form the premixed product, i.e., material is fed in one end and removed continuously from the other end.

The premixed product is fed to a model 25C59 pelletizer manufactured by Strong-Scott which is equipped with a double roll and a vertical screw. The screw serves to force the premixed product between the rolls. The rolls rotate at about 15 r.p.m. and form pellets at a rate of 1,000 pounds of pellets per hour. The hydraulic pressure is set at 2,200 psig. Pellets formed at the pelletizer drop onto a 3 foot diameter screener equipped with a ½ inch mesh screen. The screen serves to deburr the pellets. Fines are recycled back to the ribbon blender or Nauta mixer. The finished pellet product is collected and packaged.

The various dry ingredients are typically added in any order to the ribbon blender or Nauta mixer. The chlorine source is typically added last to minimize the length of time that the chlorine source is in contact with the other ingredients.

EXAMPLE 3

The following example demonstrates the good dissolution rate of pellets prepared according to this invention. 5 lbs. of metasilicate based warewashing pellets having the following composition:

| Ingredients | Wt-% |
|---|---|
| 1. Sodium tripolyphosphate | 29.2 |
| 2. Sodium metasilicate | 45.0 |
| 3. Sodium polyacrylate | 1.9 |
| 4. Sodium dichloroisocyanurate dihydrate | 2.4 |
| 5. Sodium carbonate | 20.6 |
| 6. Alkyl phosphate ester | 0.9 |

were inserted into a dispenser and contacted with water sprayed through a nozzle having a temperature of 135–155° in order to form a solution. The solution thus formed was transferred to a 30 gallon tank containing 25 gallons of fresh water. By means of an ionic sensor it was determined that it took only 2 minutes for the tank to reach the desired concentration.

EXAMPLE 4

The following example demonstrates the good dissolution rate of a water soluble bag of the present invention containing a pelletized functional composition. A water soluble bag having the following dimensions: 14 inches length, 7½ inches width and a thickness of 1.5 mils and comprising a polyvinyl alcohol film bag purchased from Chris Craft Industries, Inc. having the properties set forth in Table A and containing 5 lbs. of pellets was inserted into a dispenser. The pellets had the same composition as the pellets disclosed in Example 3. The water soluble bag containing the pellets was contacted with water having a temperature of 135–155° F. in order to form a solution. The solution thus formed was transferred to a 30 gallon tank containing 25 gallons of fresh water. By means of an ionic sensor it was determined that it took only 3 minutes and 7 seconds for the tank to reach the desired concentration.

TABLE B

The following test data demonstrates the superior performance exhibited by our metasilicate based warewashing pellets contained in a water soluble bag when compared with powdered warewashing detergents.

The test was run as follows: For six months, three different powdered detergents were utilized in dispensers for institutional warewashing machines in a number of test machines. The performance of the powders were evaluated to determine whether staining, filming and spotting of cups, glassware and silverware occurred.

For the next two or three months, our article comprising a water soluble container containing pelletized warewashing composition was utilized in the dispensers in place of the powdered detergents.

It was determined that the warewashing results obtained from use of our invention were equal to the results obtained by use of the powdered compositions, even though a lower usage of our pelletized products was used as compared to the powdered products.

It was also observed that our invention did not cause dusting and spillage problems as did the powders.

Our metasilicate based warewashing pellets which were tested, Pellet A and Pellet B, had the following formulas:

The Pellet A pellets had the formula set forth in Example 3.

The Pellet B pellets had the following formula:

| Wt-% | Ingredient |
|---|---|
| 59.6 | sodium metasilicate |
| 4.0 | sodium polyacrylate |
| 5.4 | sodium dichloroisocyanurate dihydrate |
| 29.8 | sequestering agent sodium tripolyphosphate |
| 1.2 | alkyl phosphate ester |

Five pounds of Pellet B pellets were contained in a water soluble bag having the properties of the water soluble bag described in Example 4.

Five pounds of Pellet A pellets were contained in a water soluble bag as described in Example 4.

The three powdered products, which we tested our article containing Pellet A and our article containing Pellet B pellets against, had the following, formulas:

| Wt-% | Ingredient |
|---|---|
| | Powdered Product I |
| 18.0 | sodium tripolyphosphate |
| 48.8 | sodium carbonate |
| 2.6 | sodium polyacrylate |
| 29.0 | sodium metasilicate |
| 1.6 | sodium dichloroisocyanurate dihydrate |
| | Powdered Product II |
| 4.2 | sodium carbonate |
| 1.5 | sodium polyacrylate |
| 1.8 | sodium dichloroisocyanurate dihydrate |
| 8.8 | sodium chloride |
| 1.0 | alkyl phosphate ester |
| 22.4 | sodium hydroxide |
| 22.5 | sodium tripolyphosphate |
| | Powdered Competitor Product III |
| 14.3 | sodium tripolyphosphate |
| 35.7 | sodium carbonate |
| 1.0 | sodium polyacrylate |
| 1.0 | sodium dichloroisocyanurate dihydrate |
| 22.0 | sodium chloride |
| 1.0 | alkyl phosphate ester |
| 25.0 | sodium hydroxide |

| Test No. | Average usage of pellet product | Average usage of powdered product to obtain equal results | Number of Tests |
|---|---|---|---|
| 1. | Pellet A - 0.16 | 0.23 Product II | 7 |
| 2. | Pellet B - 0.127 | 0.192 Product I | 4 |
| 3. | Pellet A - 0.17 | 0.22 Product III | 6 |
| 4. | Pellet B - 0.134 | 0.187 Product II | 4 |
| 5. | Pellet B - 0.13 | 0.2 Product II | 5 |
| 6. | Pellet B - 0.115 | 0.145 Product III | 5 |

As the data above demonstrates in each test a larger usage of the powder products had to be utilized in order to achieve a result equal to that obtained with a smaller usage of our articles containing pelletized functional composition.

2(b). WAREWASHING COMPOSITION—FORMULA II—CAUSTIC BASED

The following table sets forth the formula and preparation procedure for a caustic warewashing pellet 4 which could be used in the water soluble bag 3 of the present invention.

| Raw Material | Wt-% Broad Range | Wt-% Preferred Range | Wt-% Most Preferred Range |
|---|---|---|---|
| 1. Alkali metal hydroxide | 15-70 | 25-50 | 40 |
| 2. Inorganic sequestering agent | 10-50 | 25-45 | 35 |
| 3. Bleaching source | 0-8 | 2-6 | 5 |
| 4. Sodium carbonate | 0-40 | 10-30 | 15 |
| 5. Organic sequestering agent | 0-7 | 2-5 | 3 |
| 6. Defoaming surfactant | 0-5 | 1-3 | 2 |

Alkali Metal Hydroxide: The caustic warewashing pellet may comprise about 15-70 wt-% of an alkali metal hydroxide, preferably 25-50 wt-%, and most preferably 40 wt-% for reasons of cleaning performance. Suitable alkali metal hydroxides include but are not limited to the following: potassium hydroxide, sodium hydroxide, or mixtures of potassium and sodium hydroxide.

Inorganic Sequestering Agent: The caustic warewashing pellet may comprise about 10-50 wt-% of an inorganic sequestering agent, preferably about 25-45 wt-% for reasons of hard water control, and most preferably about 35 wt-% for reasons of economy and legal restrictions on phosphorous content. Suitable inorganic sequestering agents include but are not limited to the following: tetrasodium pyrophosphate, tetrapotassium pyrophosphate, sodium tripolyphosphate, potassium tripolyphosphate. The preferred inorganic sequestering agent is sodium tripolyphosphate, for reasons of availability and economy of use.

An organic sequestering agent can be substituted for the inorganic sequestering agent. Preferably, however, an inorganic sequestering agent is utilized for economic reasons.

Bleaching Source: The caustic warewashing pellet may comprise about 0-8 wt-% of a bleaching source, preferably about 2-6 wt-% for reasons of economy, and most preferably about 5 wt-% for reasons of cost effectiveness. Suitable bleaching sources include but are not limited to the following: calcium hypochlorite, lithium hypochlorite, chlorinated trisodium phosphate, sodium dichloroisocyanurate dihydrate, potassium dichloroisocyanurate dihydrate, sodium dichloroisocyanurate, and potassium dichloroisocyanurate. Preferably, the bleaching source comprises sodium dichloroisocyanurate dihydrate for reasons of availability and economy.

Filler: The caustic warewashing pellet may comprise about 0-40 wt-% of a filler, preferably 10-30 wt-%, and most preferably about 15 wt-% for reasons of cost effectiveness. Suitable fillers include but are not limited to the following: sodium carbonate, sodium silicate, sodium metasilicate, sodium borate, and sodium chloride. Sodium carbonate is the preferred filler for reasons of cost effectiveness and that it provides an additional source of alkalinity.

Organic Sequestering Agent: The caustic warewashing pellet may also comprise about 0-7 wt-% of an organic sequestering agent, preferably about 2-5 wt-% for reasons of economy, and most preferably about 3 wt-% for reasons of cost effectiveness.

Suitable organic sequestering agents include but are not limited to the following: citric acid, ethylene diamine tetra acetic acid (EDTA), nitrilotriacetic acid (NTA), polyacrylic acid, copolymers of acrylic acid, copolymers of itacinic acid, organic phosphonates such as amino trimethyl phosphonates, etc..

Preferred organic sequestering agents include polymeric sequestering agents such as the polyacrylates such as sodium polyacrylates for the reason that in addition to sequestering benefits they have dispersing capabilities which interfere with the crystallization of hardness ions.

Defoaming Surfactant: The caustic warewashing pellet may comprise about 0-5 wt-% of a defoaming surfactant, preferably about 1-3 wt-% for reasons of performance, and most preferably about 2 wt-% for reasons of cost effectiveness.

A "defoamer" is a chemical compound with a hydrophobe/hydrophile balance suitable to reducing the stability of protein foam. The hydrophobicity can be provided by an oleophilic portion of the molecule (e.g. and aromatic alkyl or aralkyl group; and oxypropylene unit or oxypropylene chain, or other oxyalkylene functional groups other than oxyethylene, e.g. tetramethylene oxide). The hydrophilicity can be provided with oxyethylene units or chains or blocks and/or ester groups (e.g. organophosphate esters), salt-type groups, or salt-forming groups. Typically, defoamers are honionic organic surface-active polymers having hydrophobic groups or blocks or chains and hydrophilic ester-groups, blocks, units, or chains, but anionic, cationic, and amphoteric defoamers are known. For a disclosure of nonionic defoaming surfactants, see U.S. Pat. No. 3,048,548, issued Aug. 7, 1962 (Martin et al), U.S. Pat. No. 3,334,147, issued Aug. 1, 1967 (Brunelle et al), and U.S. Pat. No. 3,442,242, issued May 13, 1969 (Rue et al). Phosphate esters are also suitable, e.g. esters of the formula RO—$(PO_3M)$—$_n$R, wherein n is as defined previously and R is an organic group or M (as defined previously), at least one R being an organic group such as oxyalkylene chain.

Preferably the defoaming surfactant comprises a block polymer of ethylene oxide and propylene oxide such as pluronic 25-R2 available from BASF which has a molecular weight of approximately 2,500 and 80% propylene oxide.

Preparation Procedure: To form the caustic warewashing pellets of the present invention all ingredients can be dry blended in an appropriate mixer such as a ribbon mixer in order to form a uniform mixture. This mixture is then pelletized to form pellets having a mass of about 5 to 15 grams using a pelletizing machine.

EXAMPLE 5

The following Example demonstrates the good dissolution rate of a water soluble bag of the present invention containing a caustic warewashing pelletized functional composition. A water soluble bag having the following dimensions: 12 inches length, 7½ inches width and a thickness of 1.5 mils and comprising a polyvinyl alcohol film bag purchased from Chris Craft Industries, Inc. having the properties set forth in Table A containing 5 lbs. of pellets is inserted into a dispenser.

The caustic based warewashing pellet composition:

| Ingredients | Wt-% |
|---|---|
| 1. Sodium hydroxide | 40 |
| 2. Sodium tripolyphosphate | 35 |
| 3. Sodium dichloroisocyanurate dihydrate | 5 |
| 4. Sodium carbonate | 15 |
| 5. Sodium polyacrylate | mw 1000-5000 |

-continued

| Ingredients | Wt-% |
|---|---|
| 6. Block polymer of ethylene oxide and propylene oxide | mw approximately 2500 80% propylene oxide |

The water soluble bag containing the pellets is contacted with water having a temperature of 135°-155° F. in order to form a solution. The solution formed is transferred to a 30 gallon tank containing 25 gallons of fresh water. By means of an ionic sensor it is determined that it took less than 3 minutes for the tank to reach the desired concentration.

3. PRESOAK COMPOSITION

The pelletized functional composition of the present invention may also comprise a presoak composition.

Various pelletized presoak compositions may be used in the water soluble bag of the present invention. An example of a pelletized silverware presoak and detarnisher composition which could be used in the water soluble bag of the present invention is the following:

Pelletized Presoak Composition

| Raw Material | Wt-% Most Preferred | Wt-% Broad | Wt-% Preferred |
|---|---|---|---|
| 1. Sequestering agent | 24 | 10-34 | 20-30 |
| 2. Conductive filler | 62.74 | 10-70 | 50-70 |
| 3. Nonionic surfactant | 3.00 | 1-5 | 2-4 |
| 4. Anionic surfactant | 3.00 | 1-5 | 2-4 |
| 5. Water | 6.00 | 1-30 | 1-10 |
| 6. Enzyme | 1.0 | 0.01-5.0 | 0.5-2.0 |
| 7. Dye | 0.06 | 0-0.10 | 0.05-0.07 |
| 8. Fragrance | 0.20 | 0-0.5 | 0.05-0.3 |

The pelletized presoak composition may comprise about 10-34 wt-% of a builder or a sequestering agent. Preferably the pelletized presoak composition contains about 20-30 wt-% of a builder or sequestering agent and most preferably about 24 wt-%. Suitable builders or sequestering agents include but are not limited to the following: sodium tripolyphosphate, EDTA (ethylene diamine tetra acetic acid), tetrasodium pyrophosphate, zeolites, citric acid, polyacrylates, NTA (nitrilotriacetic acid), and sodium carbonate. Preferably the builder or sequestering agent comprises sodium tripolyphosphate for reasons of water hardness control and cost.

Conductive Filler: The pelletized presoak composition may also comprise about 10-70 wt-% of a conductive filler, preferably about 50-70 wt-% for reasons of cost and dispensing control and most preferably about 62.74 wt-% for reasons of cost and dispensing control. The conductive filler serves to increase the conductivity of the water which is necessary in order to detarnish silverware. Suitable conductive fillers include but are not limited to the following: soda ash, sodium sulfate, sodium chloride, borax, sodium bicarbonate and sodium sesquicarbonate. Preferably the conductive filler comprises soda ash for reasons of cost, processing and dispensing control.

Nonionic Surfactant: The pelletized presoak composition may also comprise about 1-5 wt-% of a nonionic surfactant, preferably about 2-4 wt-% for reasons of wetting, and most preferably about 3 wt-% of a nonionic surfactant for reasons of wetting.

The nonionic surfactant should exhibit good detergency (i.e., it should exhibit foaming properties and good wetting properties).

Suitable nonionic surfactants include but are not limited to the following: nonyl phenol ethoxylates, and linear alcohol ethoxylates. Preferably the nonionic surfactant comprises ethoxylated nonyl phenol for reasons of optimum wetting of the surface.

Anionic Surfactant: The pelletized presoak composition may also comprise about 1 to 5 wt-% of an anionic surfactant, preferably about 2 to 4 wt-%, for reasons of wetting, and most preferably about 3 wt-% for reasons of wetting. Suitable anionic surfactants include but are not limited to the following: sulframin, alphaolefinsulfonate, sodium lauryl sulfate. Preferably, the anionic surfactant comprises sulframin for reasons of optimum wetting.

Enzyme: The pelletized presoak composition may also comprise about 0.01 to 5.0 wt-% of an enzyme, preferably about 0.5 to 2.0 wt-% for reasons of soil removal and most preferably about 1.0 wt-% of an enzyme for reasons of soil removal. Suitable enzymes include but are not limited to the following: esperase, amylase, lipase, and combinations thereof. Esperase serves to break down protein, whereas amylase breaks down starch and lipase breaks down fats. If three enzymes are utilized in the presoak composition, the broad range for each enzyme would range from between about 0.1 to 5.0 wt-%. Thus, the presoak can comprise up to 15 wt-% enzyme if three different enzymes are utilized.

Water: The pelletized presoak composition may also comprise about 1–30 wt-% water, preferably about 1–10 wt-% for reasons of dispensing control and cost, and most preferably about 6.0 wt-% water for reasons of dispensing control and cost. Water helps aid in the pelletization process and also acts as a filler.

Dye: The pelletized presoak composition may also comprise about 0 to 0.10 wt-% of a dye, preferably about 0.05 to 0.07 wt-% for reasons of aesthetics, and most preferably about 0.06 wt-% for reasons of aesthetics. Suitable dyes include any dye stable at pH's of above 10.

Fragrance: The pelletized presoak composition may also comprise about 0 to 0.5 wt-% of a fragrance, preferably about 0.05 to 3 wt-%, for reasons of aesthetics, and most preferably about 0.20 wt-% for reasons of aesthetics. Suitable fragrances include any that are compatible in the overall system.

The pelletized presoak composition can be formed by either batch or continuous processing. The pelletized presoak composition can be manufactured according to the following procedure.

Presoak Pellet Preparation: The pelletized presoak composition can be formed by either batch or continuous processing. The following is an example of a batch production process. 25 wt-% of a dry, powdered or granular sequestering agent or builder (sodium tripolyphosphate) is charged to a 100 lb. mix tank and agitation is begun. A dye is then dissolved in 4 wt-% water and sprayed onto the sodium tripolyphosphate while agitation continues until a uniform color is achieved.

Next, a conductive filler (soda ash), a nonionic surfactant (nonylphenol ethoxylate, 9.5 ethylene oxide units) an anionic surfactant (sulframin), a fragrance and an enzyme (esperase) are added in that order to the mix tank while agitation continues, resulting in the formation of a premixed product.

The premixed product is fed to a Model 25CS9 pelletizer manufactured by Strong-Scott which is equipped with a double roll and a vertical screw. The screw serves to force the premixed product between the rolls. The rolls rotate at about 15 r.p.m. and form pellets at a rate of about 1,000 lbs. of pellets per hour. The hydraulic pressure is set at 2,200 psig. Pellets formed at the pelletizer drop onto a 3' diameter screener equipped with a ½" mesh screen. The screen serves to deburr the pellets. Fines are recycled back to the mixer. The finished pellet product is collected and packaged.

EXAMPLE 6

The following example demonstrates the good dissolution rate of a water soluble bag of the present invention containing a pelletized presoak functional composition. A water soluble bag having the following dimensions: 14 inches length, 7½ inches width and a thickness of 1.5 mils and comprising a polyvinyl alcohol film bag purchased from Chris Craft Industries, Inc. having the properties set forth in Table A containing 5 lbs. of pellets is inserted into a dispenser.

| Ingredients | Wt-% |
|---|---|
| 1. Sodium tripolyphosphate | 24 |
| 2. Soda ash | 62.74 |
| 3. Nonyl phenol ethoxylate, having 9.5 moles of ethoxylate | 3.00 |
| 4. Sulframin | 3.00 |
| 5. Water | 6.00 |
| 6. Esperase | 1.00 |
| 7. Dye | 0.06 |
| 8. Fragrance | 0.20 |

The water soluble bag containing the pellets is contacted with water having a temperature of 135°–155° F. in order to form a solution. The solution formed is transferred to a 30 gallon tank containing 25 gallons of fresh water. By means of an ionic sensor it is determined that it took less than 3 minutes for the tank to reach the desired concentration.

4. GENERAL PURPOSE FLOOR AND WALL CLEANER AND MANUAL DISHWASHING PELLET

The following general purpose floor and wall cleaner and manual dishwashing pellet can be used in the water soluble bag of the present invention.

| Raw Material | Broad | Preferred |
|---|---|---|
| 1. Filler | 0–85 | |
| 2. Anionic surfactant | 5–75 | 5–35 |
| 3. Nonionic surfactant | 0–30 | (2 parts anionic surfactant to 1 part nonionic surfactant) |
| 4. Low alkaline corrosion inhibitor | 0–5 | |
| 5. Dye | 0–1 | |
| 6. Fragrance | 0–1 | |

Filler: The general purpose pellet can comprise about 0–85 wt-% of a filler. Suitable fillers include but are not limited to the following: sodium sulfate, sodium chloride, and other neutral soluble salts. Preferably the filler is sodium sulfate for reasons of minimizing corrosion to soft metals.

Anionic Surfactant: The general purpose pellet can comprise about 5–70 wt-% of an anionic surfactant, preferably about 5–35 wt-% for reasons of cost and performance. Suitable anionic surfactants include but are not limited to the following: linear dodecyl benzene sulfonate, alcohol ethoxy sulfates, alkano sulfonates, alkali and alkaline earth salts. A high concentration of anionic surfactant results in a pellet which can be pelletized easier ahd also a pellet which performs better when dissolved in water. However, a low concentration of anionic surfactant results in a pellet that is more inexpensive.

Nonionic Surfactant: The general purpose pellet comprises can comprise about 0–30 wt-% of a nonionic surfactant. Preferably the nonionic surfactant is included in an amount such that about 1 part nonionic surfactant is included for about every 2 parts of anionic surfactant. Suitable nonionic surfactants include but are not limited to the following: fatty acid amides, ethylene oxide, and/or propylene oxide adducts of alcohols.

Corrosion Inhibitor: The general purpose pellet may also comprise about 0 to 5 wt-% of a corrosion inhibitor such as a low akaline silicate such as sodium silicate or potassium silicate, preferably sodium silicate. Preferably the ratio of $M_2O:SiO_2$ is less than about 1:1.

Optional ingredients include about 0–1 wt-% of a dye and about 0–1 wt-% of a fragrance.

The general purpose pellets are formed by conventional high-pressure pellet production methods. Such methods involve combining granular-or powdered anhydrous materials, mixing them to form a premixed product and then transferring the premixed product to a pelletizer.

Optional ingredients include about 0–3 wt-% of an emollient 1 about 0–10 wt-% of an organic sequestering agent and about 0–30 wt-% of an inorganic sequestering agent. Another optional is a flow agent.

EXAMPLE 7

The following example demonstrates the good dissolution rate of a water soluble bag of the present invention containing a pelletized general purpose functional composition. A water soluble bag having the following dimensions: 12 inches length, 7½ inches width and a thickness of 1.5 mils and comprising a polyvinyl alcohol film bag purchased from Chris Craft Industries, Inc. having the properties set forth in Table A containing 4 lbs. of pellets was inserted into a dispenser.

The pellets had the following composition:

| Ingredients | Wt-% |
|---|---|
| 1. Sodium sulfate | 82.4 |
| 2. Linear dodecyl benzene sulfonate | 14.7 |
| 3. Low alkaline sodium silicate | 1.0 |
| 4. Dye | .0075 |
| 5. Diatomaceous Earth - (flow agent) | 1.0 |
| 6. Emollient | .3925 |
| 7. Sodium polyacrylate | .5 |

The water soluble bag containing the pellets was contacted with water having a temperature of 135–155° F. in order to form a solution. The solution thus formed was transferred to a 30 gallon tank containing 25 gallons of fresh water. By means of an ionic sensor it was determined that it took less than 3 minutes and 10 seconds for the tank to reach the desired concentration.

5. HARD SURFACE CLEANER PELLET

The following pelletized hard surface cleaner can be used in the water soluble bag of the present invention.

| Ingredient | Preferred wt-% | Broad Range Wt-% |
|---|---|---|
| 1. Buffering agent | 15.0 | 12.0–18.0 |
| 2. Alkalinity & Ammonium Source | 10.0 | 8.0–12.0 |
| 3. Alkalinity Source | 10.0 | 8.0–12.0 |
| 4. Inorganic Sequestering Agent | 15.0 | 12.0–18.0 |
| 5. Anionic Surfactant | 25.0 | 22.0–28.0 |
| 6. Nonionic Surfactant | 15.0 | 12.0–18.0 |
| 7. Organic Sequestering Agent | 10.0 | 8.0–12.0 |

The pelletized hard surface can comprise about 12.0–18.0 wt-% of a buffering agent, preferably about 15.0 suitable buffering agents include but are not limited to the following: sodium bicarbonate, mixtures of sodium bicarbonate and sodium carbonate, disodium phosphate, trisodium phosphate, monosodium phosphate, mixtures of disodium phosphate and trisodium phosphate, borates such as sodium tetra borate and borax, and combinations of carbonates and phosphates. Suitable combinations of carbonates and phosphates have a weight ratio about 1:1 resulting in a pH of about 9–10.

A preferred buffering agent comprises sodium bicarbonate.

The pelletized hard surface cleaner can comprise about 8.0–12.0 wt-% of an alkalinity and ammonium source, preferably about 10.0 wt-%. Suitable sources include but are not limited to the following: ammonium bicarbonate, ammonium phosphate, diammonium phosphate, a mixture of ammonium chloride and sodium carbonate and other sources capable of forming ammonium ions in solution.

The alkalinity and ammonium source provides a source of mild alkalinity and also serves as a source of ammonia which increases customer satisfaction.

The composition can also comprise about 8.0–12.0 wt-% of an alkalinity source, preferably about 10.0 wt-% suitable alkalinity sources include but are not limited to the following: soda ash (sodium carbonate), trisodium phosphate, borax, alkali metal silicates, etc.

The composition can also comprise about 12.0–18.0 wt-% of an inorganic sequestering agent preferably about 15.0 wt-%. Suitable sequestering agents include but are not limited to those set forth as being suitable for use in the laundry detergent pellet.

Preferably the sequestering agent comprises a low density sodium tripolyphosphate bead. A bead is preferred over a powder in that it can be crushed which results in a stronger nonfriable pellet.

Organic sequestering agents can be substituted for the inorganic sequestering agent.

The pelletized hard surface cleaner can also comprise about 22.0–28.0 wt-% of an anionic surfactant, preferably about 25 wt-%. Suitable anionic surfactants include but are not limited to the following: sodium dodecyl benzene sulfonate, sodium lauryl sulfate and other anionic surfactants which result in a pellet that is non pasty.

Preferably the anionic surfactant comprises sodium dodecyl benzene sulfonate for cost reasons.

The pelletized hard surface cleaner can also comprise about 22.0–28.0 wt-% of a nonionic surfactant preferably about 15.0 wt-%. Such nonionic surfactants should be high foaming. Suitable nonionic surfactants include but are not limited to the following: fatty alcohol ethoxylates which are the reaction products of alkyl phenols such as nonyl phenol and octyl phenol with ethylene oxide.

The preferred nonionic surfactants include octyl and nonyl phenol with 7-10 moles ethylene oxide.

The pelletized hard surface cleaner can also comprise about 8.0-12.0 wt-% of an organic sequestering agent, preferably about 10.0 wt-%.

Preferably the organic sequestering agent comprise tetra sodium ethylene diamine tetra acetate.

EXAMPLE 8

The following example demonstrates the good dissolution rate of a water soluble bag of the present invention containing a pelletized hard surface cleaner function composition. A water soluble bag having the following dimensions: 14 inches length, 7½ inches width and a thickness of 1.5 mils and comprising a polyvinyl alcohol film bag purchased from Chris Craft Industries, Inc. having the properties set forth in Table A containing 5 lbs. of pellets 13 are inserted into a dispenser.

| Ingredients | Wt-% |
|---|---|
| 1. Sodium Bicarbonate | 15.0 |
| 2. Ammonium Bicarbonate | 10.0 |
| 3. Light Density Soda Ash | 10.0 |
| 4. Low Density Sodium Tripoly phosphate | 15.0 |
| 5. Sodium Dodecyl benzene sulfonate - 90% flake | 25.0 |
| 6. Polyoxyethylated alcohol | 15.0 |
| 7. Tetrasodium ethylene diamine tetraacetate | 10.0 |

The water soluble bag containing the pellets is contacted with water having a temperatures of 135-155° F. in order to form a solution. The solution formed is transferred to a 30 gallon tank containing 25 gallons of fresh water. By means of an ionic sensor it is determined that it takes less than 3 minutes for the tank to reach the desired concentration.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follows in the spirit and broad scope of the appended claims are included.

I claim:

1. An article of manufacture which comprises:
(a) a dispenser containing an aqueous liquid spray means;
(b) a sealed water soluble container; and
(c) an institutional multiple use amount of greater than about 200 grams of a pelletized water soluble or dispersible functional composition contained within said water soluble container, wherein said water soluble container fits within said dispenser and is capable of forming an aqueous solution by action of said liquid spray on said pelletized functional composition, and said pelletized functional composition comprises:
(i) about 10-34 wt-% of a sequestering agent;
(ii) about 10-70 wt-% of a conductive filler;
(iii) about 1-5 wt-% of a nonionic surfactant; and
(iv) about 1-5 wt-% water;
whereby said conductive filler provides electrical conductivity to an aqueous solution or dispersion of said functional composition.

2. The article of claim 1 wherein the pelletized functional composition further comprises about 0 to 0.10 wt-% of a dye.

3. The article of claim 1 wherein the pelletized functional composition further comprises about 0 to 0.5 wt-% of a fragrance.

4. The article of claim 1 wherein the water soluble container comprises a water soluble bag.

5. The article of claim 1 wherein the water soluble container has a minimum water temperature range for solubility of about 34° F.

6. The article of claim 1 wherein the water soluble container comprises a water soluble polymer selected from the group consisting of a polyvinyl alcohol, polyvinyl acetate, polyvinyl pyrrolidine or mixtures thereof.

7. The article of claim 1 wherein the water soluble container contains about 200 grams to 5,000 grams of pelletized functional material.

8. The article of claim 1 wherein each pellet has a mass of about 2 to 30 grams.

9. The article of claim 1 wherein each pellet has a width ranging from about 5 to 30 mm., a height ranging from about 10 to 80 mm. and a depth ranging from about 10 to 30 mm.

10. The article of claim 1 wherein the water soluble container will dissolve when exposed to a water spray having a minimum water temperature of about 40° F. and a minimum nozzle pressure of about 25 to 30 psig such that the pelletized functional material is exposed in about 0.5-3 minutes.

11. The article of claim 7 wherein the conductive filler is soda ash, sodium sulfate, sodium chloride, borax, sodium bicarbonate or sodium sesquicarbonate.

12. The article of claim 1 wherein the sequestering agent is an alkali metal phosphate, sodium aluminosilicate, sodium carbonate, ethylenediaminetetraacetic acid, nitrilotriacetic acid, a phosphonate, a polyacrylic acid or polyacrylate, a copolymer of acrylic acid, a copolymer of itaconic acid, a zeolite, or citric acid.

13. An article of manufacture which comprises:
(a) a dispenser containing an aqueous liquid spray means;
(b) a sealed water soluble container; and
(c) an institutional multiple use amount of greater than about 200 grams of a pelletized water soluble of dispersible functional composition contained within said water soluble container, wherein said water soluble container fits within said dispenser and is capable of forming an aqueous solution by action of said liquid spray on said pelletized functional composition, and the pelletized functional composition comprises:
(i) an effective buffering amount of a buffering agent;
(ii) an effective amount of an alkalinity and ammonium source to provide a source of mild alkalinity and desired amount of ammonia;
(iii) about 8-30 wt-% of a sequestering agent; and
(iv) about 12-28 wt-% of a surfactant.

14. The article of claim 13 wherein the water soluble container comprises a water soluble bag.

15. The article of claim 13 wherein the water soluble container has a water temperature range for solubility of about 34° F. minimum.

16. The article of claim 13 wherein the water soluble container comprises a water soluble polymer selected from the group consisting of a polyvinyl alcohol, polyvinyl acetate, polyvinyl pyrrolidine or mixtures thereof.

17. The article of claim 13 wherein the water soluble container contains about 200 grams to 5,000 grams of pelletized functional material.

18. The article of claim 13 wherein each pellet has a mass of about 2 to 30 grams.

19. The article of claim 13 wherein each pellet has a width ranging from about 5 to 30 mm., a height ranging from about 10 to 80 mm., and a depth ranging from about 10 to 30 mm.

20. The article of claim 13 wherein the water soluble container will dissolve when exposed to a water spray having a minimum water temperature of about 40° F. and a minimum nozzle pressure of about 25 to 30 psig such that the pelletized functional material is exposed in about 0.5–3 minutes.

21. The article of claim 13 wherein the sequestering agent is an alkali metal phosphate, sodium aluminosilicate, sodium carbonate, ethylenediaminetetraacetic acid, nitrilotriacetic acid, a phosphonate, a polyacrylic acid or polyacrylate, a copolymer of acrylic acid, a copolymer of itaconic acid, a zeolite, or citric acid.

* * * * *

UNITED STATES PATENT AND TRADEMARK OFFICE
CERTIFICATE OF CORRECTION

PATENT NO. : 5,198,198

DATED : March 30, 1993

INVENTOR(S) : Elizabeth J. Gladfelter et al.

It is certified that error appears in the above-identified patent and that said Letters Patent is hereby corrected as shown below:

TITLE PAGE

[75] Inventors: "Sheryl D. Slocumb" should read --Sheryl D. Rose--.

Column 23, Line 24 "honionic" should read --nonionic--.

Column 29, Line 9 "comprise" should read --comprises--.

Column 29, Line 15, 16 "function" should read --functional--.

Signed and Sealed this

Fifteenth Day of February, 1994

Attest:

BRUCE LEHMAN

*Attesting Officer*

*Commissioner of Patents and Trademarks*